United States Patent
Baghel et al.

(10) Patent No.: US 10,798,725 B2
(45) Date of Patent: Oct. 6, 2020

(54) APPARATUSES AND METHODS FOR ULTRA RELIABLE LOW LATENCY COMMUNICATIONS IN NEW RADIO BASED VEHICLE TO EVERYTHING ENVIRONMENT

(71) Applicant: QUALCOMM incorporated, San Diego, CA (US)

(72) Inventors: Sudhir Kumar Baghel, Hillsborough, NJ (US); Junyi Li, Chester, NJ (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/140,739

(22) Filed: Sep. 25, 2018

(65) Prior Publication Data
US 2019/0098649 A1    Mar. 28, 2019

Related U.S. Application Data

(60) Provisional application No. 62/563,563, filed on Sep. 26, 2017.

(51) Int. Cl.
*H04W 72/12* (2009.01)
*H04L 5/00* (2006.01)
(Continued)

(52) U.S. Cl.
CPC ....... *H04W 72/1257* (2013.01); *H04L 1/0068* (2013.01); *H04L 1/1812* (2013.01);
(Continued)

(58) Field of Classification Search
CPC . H04L 72/1257; H04L 72/1289; H04L 5/003; H04L 5/0007; H04L 5/0048; H04L 1/1812; H04L 1/0068
See application file for complete search history.

(56) References Cited

U.S. PATENT DOCUMENTS

| | | |
|---|---|---|
| 2018/0063865 A1* | 3/2018 | Islam ................. H04W 76/27 |
| 2018/0083758 A1* | 3/2018 | Islam ................. H04L 5/0083 |

(Continued)

OTHER PUBLICATIONS

CATT, "NR frame structure for multiplexing of URLLC and eMBB traffic", R1-1608764; 3GPP TSG RAN WG1 #86bis Lisbon Portugal, Oct. 10-14, 2016 (Year: 2016).*

(Continued)

*Primary Examiner* — Gary Mui
(74) *Attorney, Agent, or Firm* — Haojin Wang

(57) ABSTRACT

A method, apparatus, and computer-readable medium at a transmitting user equipment (UE) in a distributed cellular vehicle-to-everything environment are disclosed to achieve communications between the distributed UEs with high reliability and low latency. A transmitting UE can configure an ultra-reliable low-latency communication (URLLC) transmission unit by configuring a URLLC channel indicator, a URLLC transmission indicator, a URLLC control channel, and URLLC data portion. The UE can transmit the configured URLLC transmission unit in punctured OFDM symbols within a regular subframe to a receiving UE in the distributed C-V2X environment.

22 Claims, 13 Drawing Sheets

(51) Int. Cl.
*H04L 1/00* (2006.01)
*H04L 1/18* (2006.01)
*H04B 7/0413* (2017.01)
*H04W 4/40* (2018.01)
*H04W 4/44* (2018.01)

(52) U.S. Cl.
CPC ............ *H04L 5/003* (2013.01); *H04L 5/0007* (2013.01); *H04L 5/0048* (2013.01); *H04W 72/1289* (2013.01); *H04B 7/0413* (2013.01); *H04W 4/40* (2018.02); *H04W 4/44* (2018.02)

(56) References Cited

U.S. PATENT DOCUMENTS

| | | | |
|---|---|---|---|
| 2018/0103468 A1* | 4/2018 | Li | H04B 7/14 |
| 2019/0116007 A1* | 4/2019 | Yi | H04W 4/42 |
| 2019/0174440 A1* | 6/2019 | Kwak | H04W 52/0216 |
| 2019/0190645 A1* | 6/2019 | Sano | H04L 1/0004 |
| 2019/0191443 A1* | 6/2019 | Sano | H04L 29/06 |
| 2019/0246385 A1* | 8/2019 | Lin | H04L 5/0007 |
| 2019/0254058 A1* | 8/2019 | Xie | H04L 1/00 |
| 2019/0312659 A1* | 10/2019 | Chen | H04W 72/04 |
| 2019/0334754 A1* | 10/2019 | Chen | H04L 27/2662 |

OTHER PUBLICATIONS

Sony, "Multiplexing eMBB and URLLC Transmission"; R1-1608942; 3GPP TSG RANwG1 Meeting #86bis Lisbon, Portugal Oct. 10-14, 2016 (Year: 2016).*

Samsung; "eMBB and URLLC multiplexing in DL"; R1-1612540; 3GPP TSG RAN WG1 Meeting #87 Reno, USA Nov. 14-18, 2016 (Year: 2016).*

Huawei et al: "Overview of URLLC Support in NR," 3GPP Draft; R1-1608843, 3rd Generation Partnership Project (3GPP), Mobile Competence Centre; 650 Route Des Lucioles; F-06921 Sophia-Antipolis Cedex; France, vol. RAN WG1, No. Lisbon, Portugal; Oct. 10, 2016-Oct. 14, 2016, Oct. 1, 2016 (Oct. 1, 2016), XP051159170, Retrieved from the Internet: URL:http://www.3gpp.org/ftp/tsg_ran/WG1_RL1/TSGR1 _86b/Docs/ [retrieved on Oct. 1, 2016].

Interntional Search Report and Written Opinion—PCT/US2018/052794—ISA/EPO—dated Nov. 22, 2018.

Qualcomm Incorporated: "DL Indication Channel Design Principle for URLLC/eMBB Dynamic Multiplexing", 3GPP Draft, R1-1708637 DL Indication Channel Design Principle for URLLCEMBB Dynamic Multiplexing, 3rd Generation Partnership Project (3GPP), Mobile Competence Centre, 650, Route Des Lucioles, F-0692, vol. RAN WG1, No. Hangzhou, May 15, 2017-May 19, 2017, May 14, 2017 (May 14, 2017), XP051273824, 10 Pages, Retrieved from the Internet: URL:http://www.3gpp.org/ftp/Meetings_3GPP_SYNC/RAN1/Docs/ [retrieved on May 14, 2017].

Qualcomm: "On V2X evolution Qualcomm", 3GPP Draft, RP-162121-R15-V2X, 3rd Generation Partnership Project (3GPP), Mobile Competence Centre, 650, Route Des Lucioles, F-06921 Sophia-Antipolis Cedex, France No. Vienna; Dec. 1, 2016 Dec. 4, 2016 (Dec. 4, 2016), XP051183550, 12 Pages, Retrieved from the Internet: URL:http://www.3gpp.org/ftp/Meetings 3GPP SYNC/RAN/Docs/ [retrieved on Dec. 4, 2016].

Sony: "Remaining issues on using Pre-Emption Indicator for DL URLLC/eMBB Multiplexing", 3GPP Draft, R1-1710865—REL-15 NR—Remaining Issues on Pre-Eption Indicator V02, 3rd Generation Partnershp Project (3GPP), Mobile Competence Ceentre, 605, Route Des Lucioles, F-06921 Sophia-Antip, vol. RAN WG1, No. Qingdao, P.R. China, Jun. 27, 2017-Jun. 30, 2017, Jun. 26, 2017 (Jun. 26, 2017), XP051300069, 9 Pages, Retrieved form the Internet: URL:http://ww.3gpp.org/ftp/Meetings_3GPP_SYNC/RAN1/Doc/ [retrieve on Jun. 26, 2017].

* cited by examiner

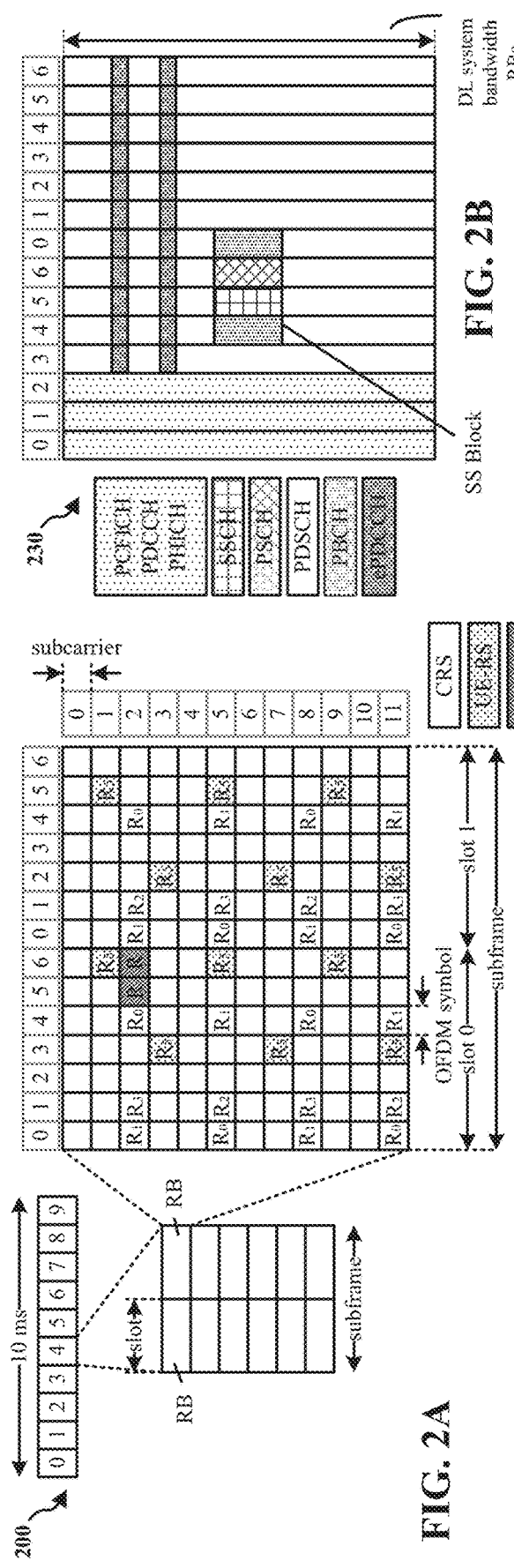
FIG. 2A
FIG. 2B
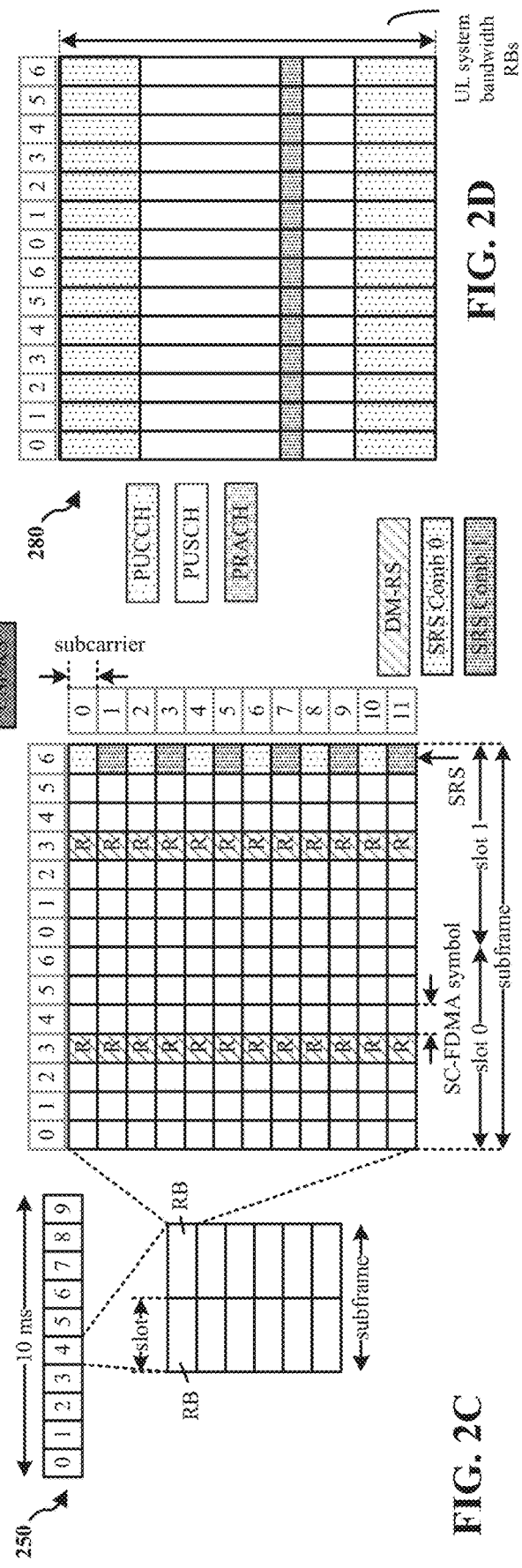
FIG. 2C
FIG. 2D

APPARATUSES AND METHODS FOR ULTRA RELIABLE LOW LATENCY COMMUNICATIONS IN NEW RADIO BASED VEHICLE TO EVERYTHING ENVIRONMENT

INTRODUCTION

This application claims priority to and the benefit of U.S. Provisional Patent Application No. 62/563,563 filed in the United States Patent and Trademark Office on Sep. 26, 2017, the entire content of which is incorporated herein by reference as is fully set forth below in its entirety and for all applicable purposes.

FIELD

The present disclosure relates generally to communication systems, and more particularly, to an ultra-reliable low-latency communications (URLLC) in new radio (NR) based cellular vehicle-to-everything (C-V2X) environment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Wireless communication systems may also include, or support networks used for vehicle based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle based communications, however, may also be associated with various requirements, e.g., communication requirements, security and privacy requirements, etc. Other example requirements may include, but are not limited to, reduced latency requirements, higher reliability requirements, and the like. For example, vehicle-based communications may include communicating sensor data that may support self-driving cars. Sensor data may be used between vehicles to improve the safety of self-driving cars.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Regular subframe transmission may not be sufficiently reliable for the URLLC data in face of interferences from other UEs in a distributed C-V2X environment. Furthermore, the regular subframe transmission latency may not be sufficiently low for the URLLC data. Thus, there is a need for apparatus and methods for transmission of URLLC data with improved latency and reliability.

A method, apparatus, and computer-readable medium at a transmitting user equipment (UE) in a distributed C-V2X environment are provided to achieve communications between the distributed UEs with high reliability and low latency. A transmitting UE in a distributed C-V2X environment can configure a URLLC transmission unit by configuring a URLLC channel indicator, a URLLC transmission indicator, a URLLC control channel, and a URLLC data portion. Then the transmitting UE can transmit the configured URLLC transmission unit in punctured orthogonal frequency divisional multiplexing (OFDM) symbols within a regular subframe to a receiving UE to achieve low latency and high reliability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
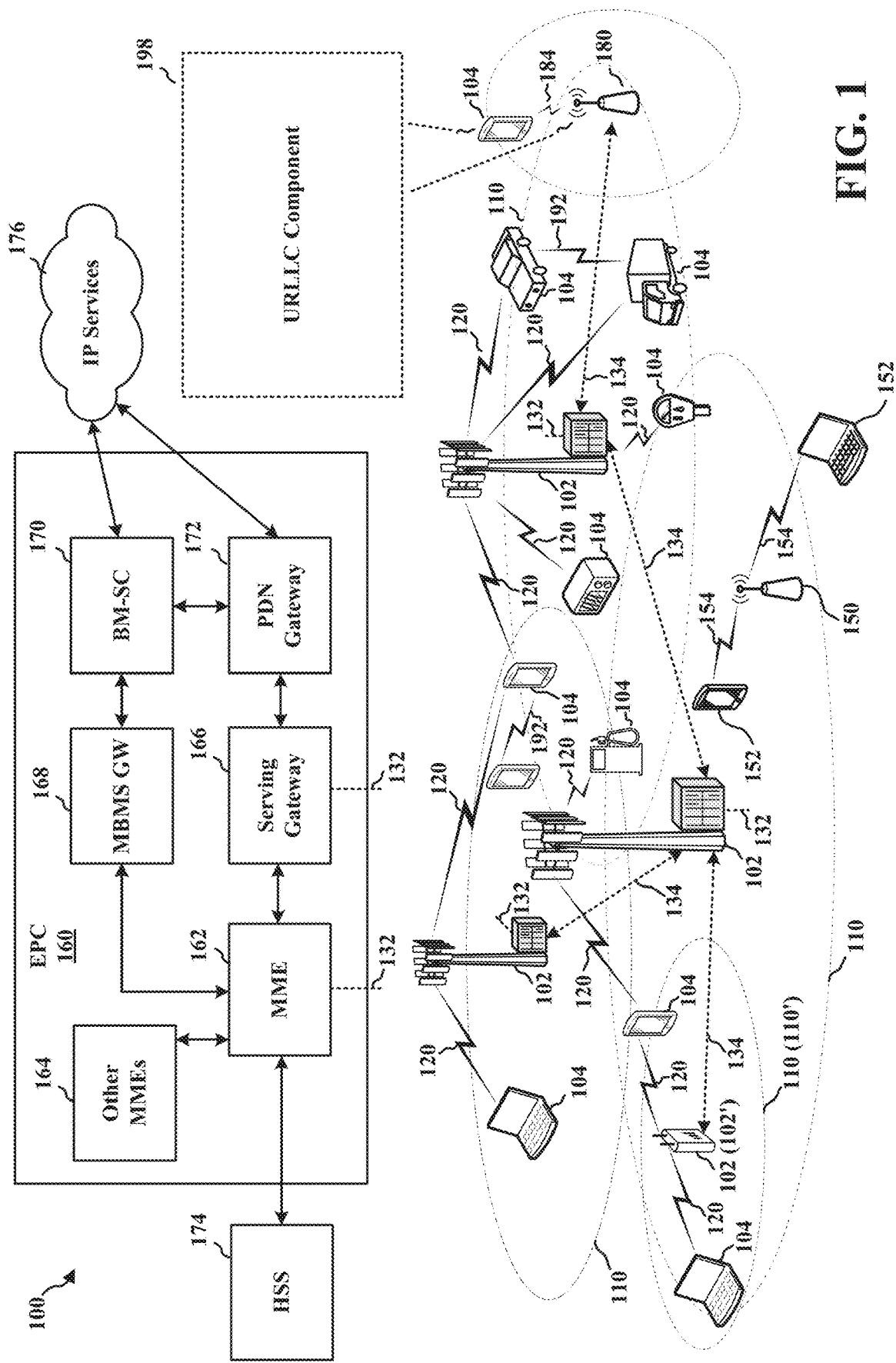
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., SI interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104s may be configured to include a URLLC component (198) that enables the UEs 104 to configure and transmit URLLC data in addition to regular data. The URLLC component may include configuring a URLLC transmission unit and transmitting the URLLC transmission unit to a peer UE in a distributed C-V2X environment.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0 and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the hybrid automatic repeat request (HARQ) indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI.

Figure 3:
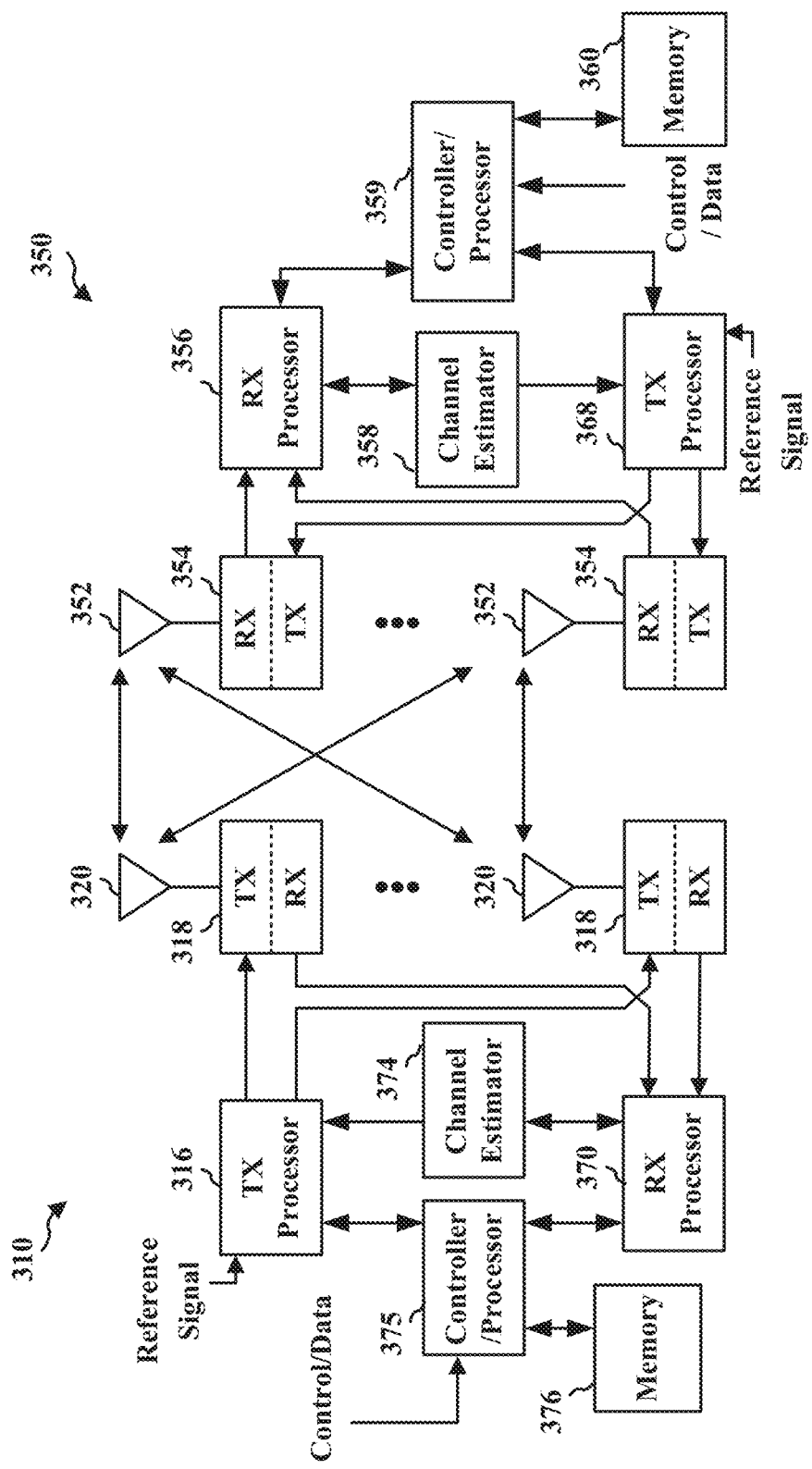
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
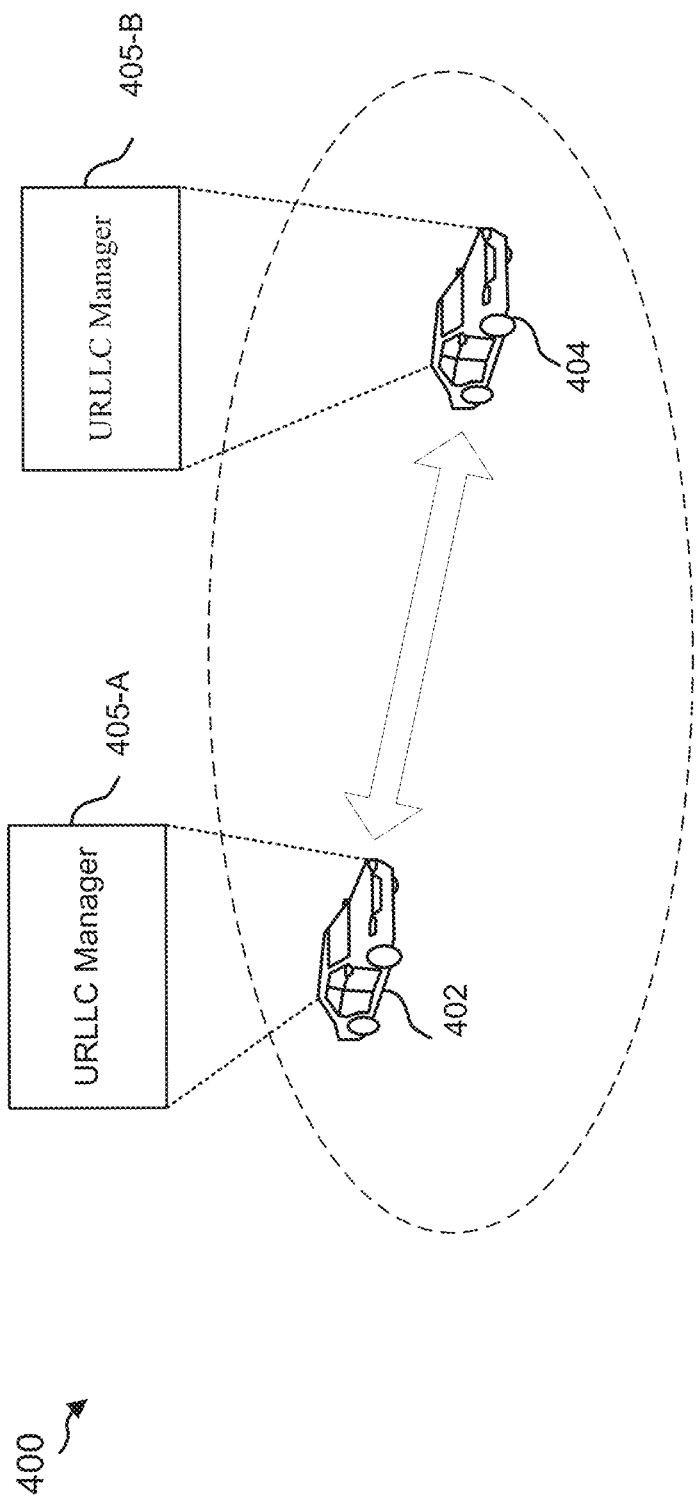
FIG. 4 illustrates an example of a wireless communications system that supports URLLC data transmission in a distributed C-V2X environment in accordance with one or more aspects of the present disclosure.

FIG. 4 illustrates an example of a wireless communications system 400 that supports URLLC data transmission in a distributed C-V2X environment in accordance with one or more aspects of the present disclosure. In some example aspects, the wireless communications system 400 may implement aspects of wireless communication system 100.

The wireless communications system 400 may include UEs 402 and 404. The UEs 402 and 404 may be examples of a UE 104 as described with reference to FIG. 1 (e.g. a phone, laptop, vehicle, etc.), and may be configured for C-V2X communication over one or more carriers of a shared frequency bandwidth. In some examples, a UE vehicle, such as the UEs 402 and 404, may execute one or more sets of codes or sequences, to control the functional elements of the device, and perform some or all of the functions described below.

As shown in FIG. 4, either the UE 402 or the UE 404 may operate as a URLLC data transmitter and the other UE as a URLLC data receiver, depending whether a UE has URLLC data to send to the other UE. The UEs 402 and 404 may include URLLC managers 405A and 405B respectively. The URLLC managers 405A and 405B may have a subset or all of the functions of the URLLC component 198 of FIG. 1.

The URLLC manager 405A, if the UE 402 is operating as a URLLC data transmitter, may be configured to monitor interferences from neighboring UEs, including the UE 404. The UE 402 may then configure a URLLC transmission unit. A URLLC transmission unit may include a URLLC control channel and data portion. Among others, the URLLC manager 405A may puncture a regular subframe and insert the configured URLLC transmission unit in the punctured OFDM symbols of the regular subframe. The URLLC manager 405A then sends the punctured subframe to the receiving UE 404.

The URLLC manager 405B at the receiving UE 404 may receive the punctured subframe and determine the URLLC transmission unit from the received subframe and process the URLLC data. Determining the URLLC transmission unit may involve decoding the URLLC control channel and the URLLC data portion of the URLLC transmission unit.

Figure 5:
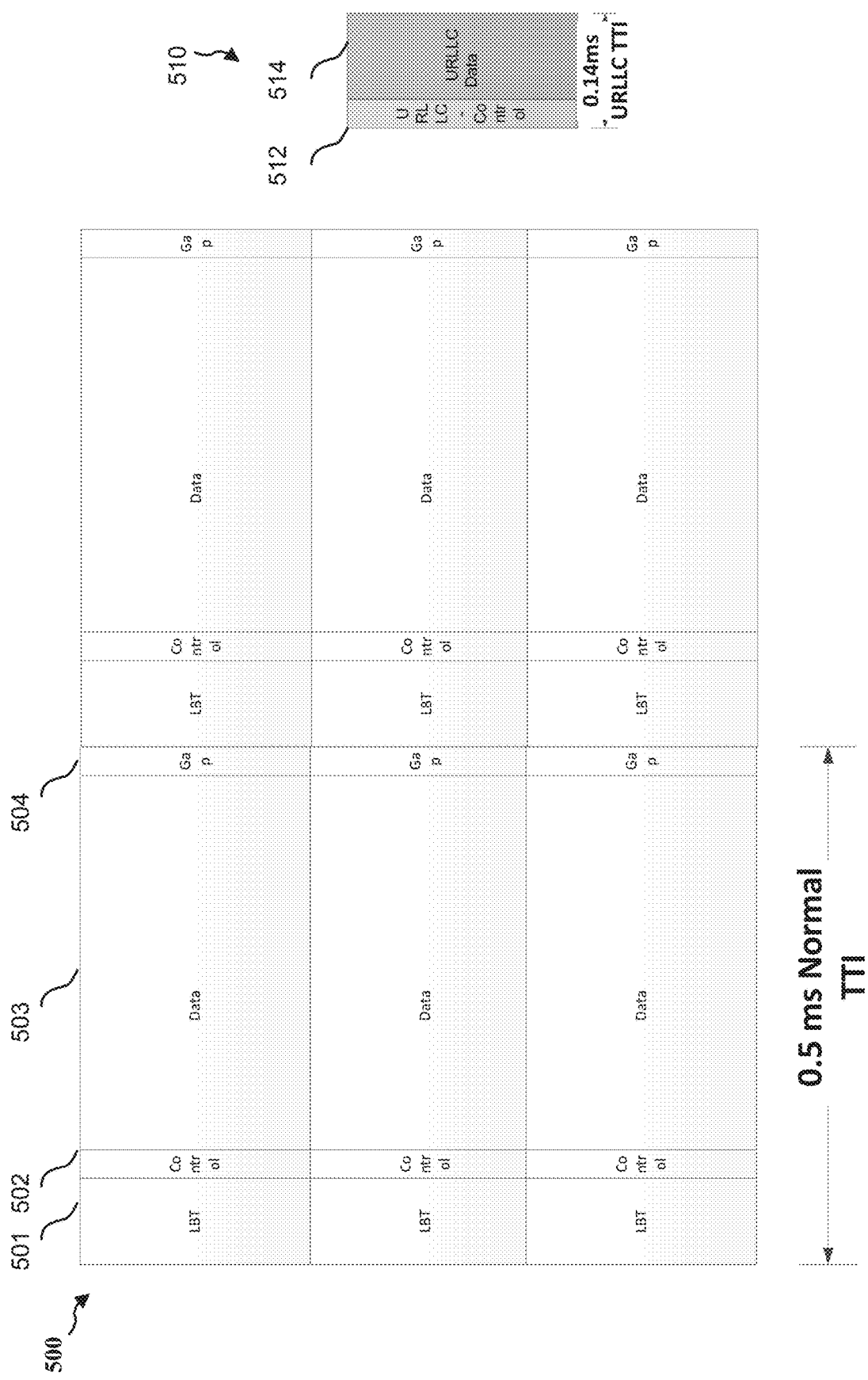
FIG. 5 illustrates an example frame structure for a regular TTI in comparison with an example frame structure for an URLLC TTI in accordance with one or more aspects of the present disclosure.

FIG. 5 illustrates an example frame structure 500 for regular transmission time interval (TTI) in comparison with an example frame structure for an URLLC TTI in accordance with one or more aspects of the present disclosure. The terms "regular subframe," "regular TTI," or similar terms, as used throughout the present disclosure, refer to a frame structure, and a TTI, as defined in a widely deployed standard, as such the UTMS or LTE standard. For example, the subframe structures as shown in FIG. 2A and FIG. 2C are subframe structures for LTE downlink and uplink transmissions respectively. They may be referred to a "regular subframes" as used in the present disclosure. In such an example, a regular LTE subframe includes two slots and each slot includes 7 OFDM symbols.

The regular TTI for the regular frame structure 500 may refer to a TTI for a regular LTE subframe and spans 0.5 millisecond. The LTE subframes are transmission resources and various channel structures may be built on the resources. One example channel structure for the regular subframe is shown in the regular frame structure 500. Within the regular TTI, the channel structure may include a listen before talk (LBT) channel 501 that is for contention-based handshakes such as request to send (RTS) and consent to send (CTS) message exchanges between a transmitting network device and a receiving network device. The frame structure 500 may also include a regular control channel 502 that may include control information such as demodulation information and MIMO information for the data channel 503. The data channel 503 may carry regular LTE data. The gap field 504 is for transition between the receiving mode and transmitting mode if the transmitting device operates in a half-duplex mode.

In contrast, the example URLLC channel structure 510 may include a URLLC control channel 512 and a URLLC data channel 514. The URLLC control channel may carry information such as MIMO information and demodulation for the URLLC data. As shown in the URLLC channel structure 510, an example URLLC TTI may span 0.14 ms, a small portion of the TTI for a regular subframe. In other words, there are 4 OFDM symbols of 35 us each, giving the 0.14 ms URLLC TTI. One effect of such a short URLLC TTI is to have short URLLC data packet with a lower transmission latency, or lower latency, as desired for URLLC transmissions.

Additionally, the example URLLC channel structure 510 does not include any LBT symbols or gap symbols to further reduce the URLLC packet size and thus the transmission latency. In general, the regular LBT symbols may create a large overhead and thus increase the transmission latency.

Figure 6:
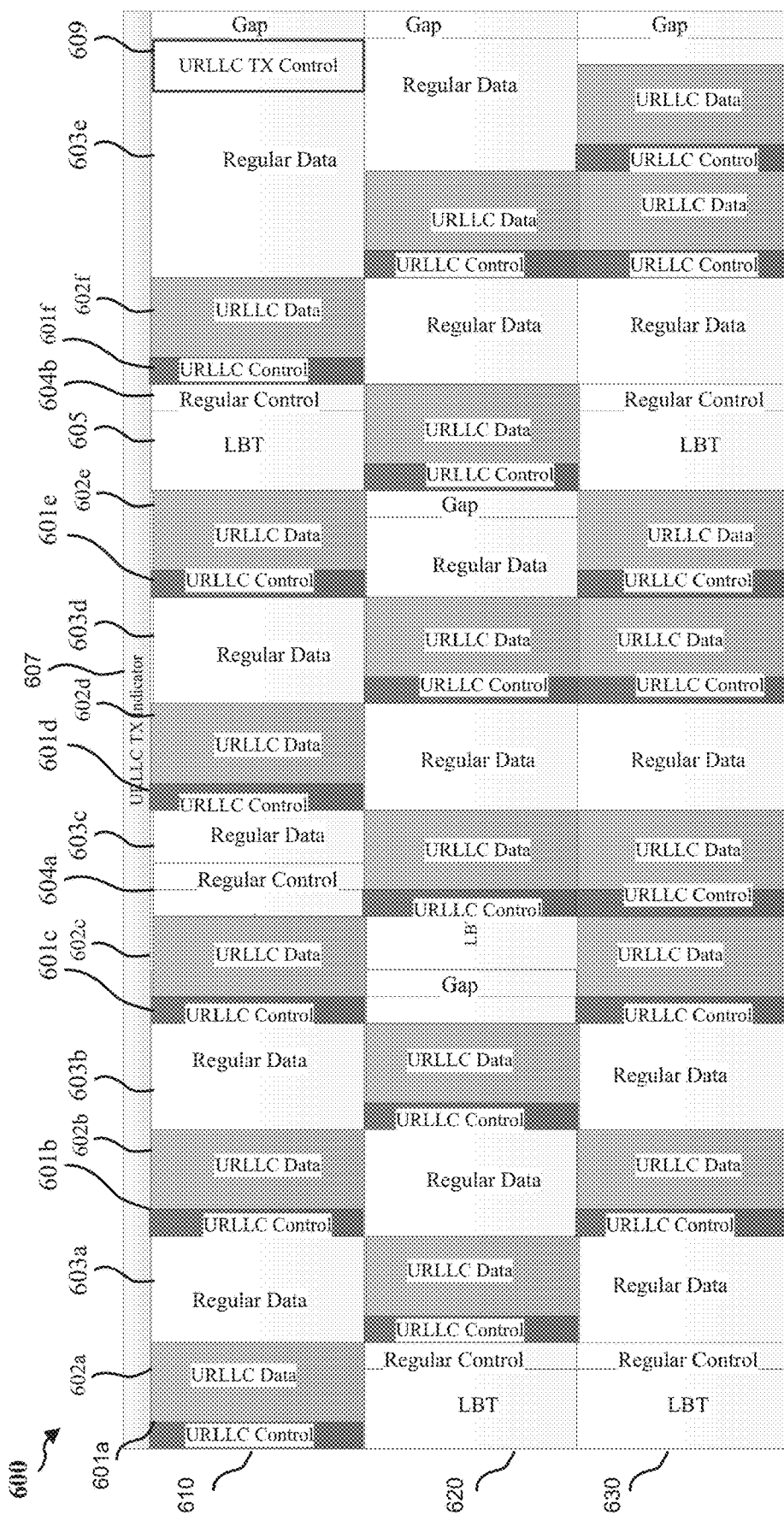
FIG. 6 illustrates an example subframe structure for a URLLC transmission unit co-existing with a regular subframe in accordance with one or more aspects of the present disclosure.

FIG. 6 illustrates an example subframe structure 600 for a URLLC transmission unit co-existing with a regular subframe in accordance with one or more aspects of the present disclosure. The subframe structure 600 illustrates URLLC channels interleaved with channels within a regular subframe. The subframe structure 600 includes three subchannels 610, 620 and 630. The term "subchannel," as used throughout the present disclosure, refers to a block of radio frequency resource, which may include a set of physical channels, such as URLLC control channels and regular control channels, as described below.

There is a URLLC transmission indicator 607 for each URLLC transmission unit. In one example aspect, the URLLC transmission indicator is a one-bit channel indicating whether there is any URLLC transmission within the subframe. If the URLLC transmission indicator 607 is set, the receiving UE will start looking for at least one URLLC transmission unit within each subframe. In one aspect, the URLLC transmission indicator 607 is located at the beginning of the subframe. In another aspect, the URLLC transmission indicator 607 is located right before a URLLC transmission unit.

In one example, a URLLC transmission unit includes a URLLC control channel and a URLLC data portion or data channel. For example, there are six URLLC transmission units within the subchannel 610: six URLLC control channels 601a-601f and six URLLC data channels 602a-602f. Each URLLC control channel may carry URLLC control information for the corresponding URLLC data channel and each URLLC data channel may carry URLLC data. Each URLLC data channel may immediately follow the corresponding URLLC control channel. In one example aspect, a URLLC control channel may carry information concerning the URLLC data, such as MIMO information for URLLC data transmission, and demodulation information for demodulating the URLLC data, among others.

Still within the subchannel 610, there are regular data channels 603a-603e that carry regular data, for example, LTE data. There are two regular control channels 604a and 604b for carrying control information for the regular data channels. The example control information may include MIMO information and demodulation information for the regular data channel. An LBT channel 605, similar to the LBT channel 501 of FIG. 5, is used for contention-based handshakes such as RTS and CTS message exchanges between the UE and another distributed UE in the distributed C-V2X environment.

In one example embodiment, at end of the subchannel/resource block 610 is a URLLC channel indicator 609. The URLLC channel indicator 609 indicates the length and position of the OFDM symbols that are used to carry the URLLC transmission unit. This way, the receiving UE may determine and decode the URLLC control channel and URLLC data efficiently.

In one example aspect, the six URLLC control channels 601a-601f and the six URLLC data channels 602a-602f may be pre-configured or pre-allocated. When the transmitting UE has URLLC data to send, the UE may use the pre-allocated resource to carry URLLC control information and URLLC data. If there is not any URLLC data to send, the pre-allocated resources are used to carry regular control and data.

In another example aspect, the six URLLC control channels 601a-601f and six URLLC data channels 602a-602f may be allocated on demand via signaling messages such as radio resource control (RRC) messages. When the transmitting UE has URLLC data to send, the transmitting UE may itself functions as a control node or via a serving eNodeB and allocate the URLLC resources as shown in FIG. 6 to transmit URLLC control information and URLLC data. This way, if there is not any URLLC data to send, the transmitting UE may avoid a pre-allocation procedure to pre-configure URLLC resources.

Figure 7:
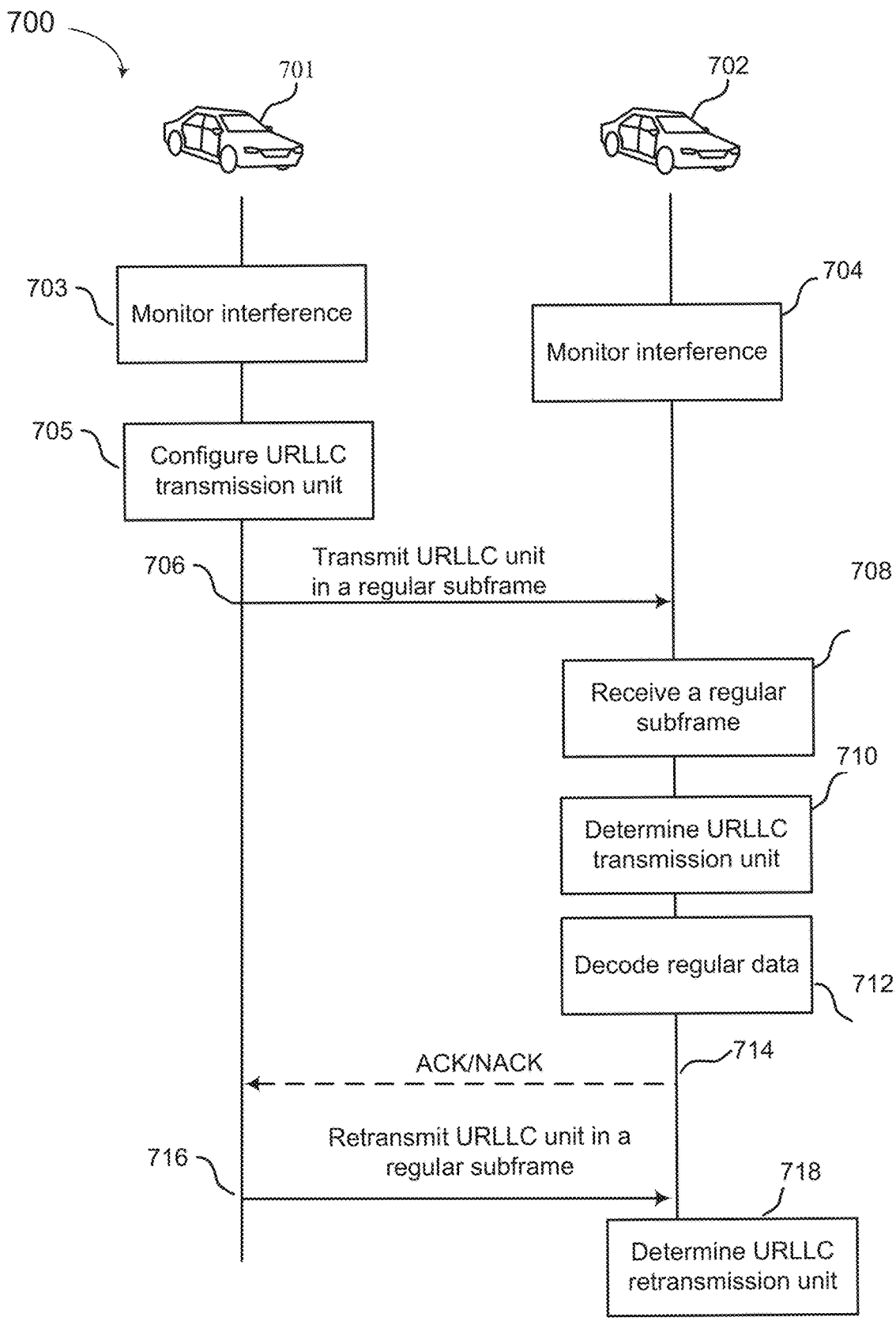
FIG. 7 illustrates an example of a wireless communications system that supports URLLC data transmission in a distributed C-V2X environment in accordance with one or more aspects of the present disclosure.

FIG. 7 illustrates an example of a wireless communication system 700 in a distributed C-V2X environment that supports URLLC data transmission in accordance with one or more aspects of the present disclosure. The wireless communication system 700 includes a URLLC-capable transmitting vehicle UE 701 and a URLLC-capable receiving vehicle UE 702 in a distributed C-V2X environment.

At 703, the transmitting vehicle UE 701, or the UE 701 for simplicity, monitors interferences from other UEs in the C-V2X environment, including the receiving vehicle UE 702, or the UE 702. The interference monitoring may help determine the manner in which the UE 701 transmits the URLLC data, when the UE 701 has URLLC data to transmit, as will be explained in more details in the relevant parts of the description for FIG. 8.

In one example at 704, the receiving UE 702 may monitor interferences from other UEs in the distributed C-V2X environment. Like the UE 701, the UE 702 is configured to be ready to transmit or receive URLLC data at any time. In one example aspect, the interference level detected may affect the manner in which the UE 702 receive the URLLC data, as will be explained in more details in the relevant parts of the description for FIG. 8.

At 705, the UE 701 configures at least one URLLC transmission unit when the UE 701 has some URLLC data to transmit. In one example scenario, the UE 701 may intend to change its driving lane to a neighboring lane and the UE 701 may want to send a URLLC message to the UE on that neighboring lane right behind the UE 701, to indicates its intention for a lane change and other related information, such as its speed and the time to initiate the lane change.

In one example aspect, to configure the URLLC transmission unit, the UE 701 may determine the number of OFDM symbols within a regular subframe to puncture to fit the URLLC control and URLLC data. The UE 701 may also set a one-bit URLLC transmission indicator to indicate there is some URLLC data to transmit in the subframe. The UE 701 may also insert URLLC control information into a URLLC control channel to help the receiving UE 702 to decode the URLLC data correctly.

At 706, the UE transmits the configured at least one URLLC transmission unit, which includes both URLLC control information and URLLC data, to the receiving UE 702. To transmit the URLLC transmission unit, the UR 701 may transmit the punctured portion of the regular subframe with a power spectrum density (PSD) higher than a PSD for rest of the subframe when there an inference is detected. A higher PSD of the transmission power is to counter the interference and thus may increase the reliability of the URLLC transmission.

The UE 701 may also transmit the URLLC transmission unit with a URLLC TTI, which is a portion of the regular TTI for a regular subframe. The UE 701 may also transmit the URLLC transmission unit on a randomly selected subchannels to avoid being interfered when the interference is higher than a threshold or the interference comes from one of the at least one other UE that is transmitting data on the same frequency. The UE 701 may also transmit the URLLC transmission unit over two virtual URLLC slots over two subchannels to reduce or avoid interference to the URLLC transmission.

At 708, the UE 702 receives a regular subframe. At this point, the UE 702 does not know whether the received regular subframe contains any URLLC data. At 710, the UE 720 may first determine whether a URLLC transmission unit is present. To determine whether a URLLC transmission unit is included in the received subframe, the UE 702 may first check a one-bit URLLC transmission indicator at the beginning of the received regular subframe. If the URLLC transmission indicator is not set, the UE 702 proceeds to processes the received subframe as a regular subframe. However, if the URLLC indicator channel is set, the UE 702 proceeds to determining the URLLC transmission unit which includes both URLLC control information and URLLC data.

In one example aspect, in order to determine at least one URLLC transmission unit, the UE 702 may check for a URLLC channel indicator at the end of the received regular subframe. Then the UE 702 may determine the location and length of the URLLC control channel and URLLC data portion based on the information in the URLLC channel indicator. Based on the determined location and length of the URLLC control channel and the URLLC data portion, the UE 702 may proceed to decoding the URLLC control information and URLLC data.

In one example aspect, the UE may determine the URLLC transmission unit within a URLLC TTI, which is a portion of the regular TTI of the regular subframe. In another example aspect, the UE may determine the URLLC transmission unit by detecting a transmission power for the URLLC transmission unit having a power spectrum density (PSD) higher than that of other parts of the regular subframe when there is a strong interference.

In another example aspect, the UE may determine the URLLC transmission unit by detecting the URLLC transmission unit on a randomly selected subchannel or by detecting the URLLC transmission unit over two virtual URLLC slots for the URLLC TTI, when a strong interference is detected, as will be explained in more details in the relevant parts of the description for FIG. 11.

At 712, after determining the URLLC transmission unit, the receiving UE 702 may continue to process remaining portion of the received subframe by decoding regular data from the remaining portion of the received subframe. At 714, the UE 702 may optionally send an ACK/NACK for the regular subframe. If it is a NACK, the UE 701 may retransmit the URLLC transmission unit in the regular subframe retransmission. In one alternative embodiment, the UE 702 does not provide ACK/NACK feedback in order to achieve a low-latency performance.

At 716, the UE 701 may perform a blind HARQ retransmission or broadcast retransmission of the URLLC transmission unit in order to reduce the transmission latency. This will be explained in more details, in the relevant parts of the description for FIG. 8.

At 718, the UE 702 determines a retransmitted URLLC transmission unit by either processing a blind HARQ retransmission or monitoring a broadcast transmission from the UE 701, as will be explained in more details, in the relevant parts of the description for FIG. 11.

Figure 8:
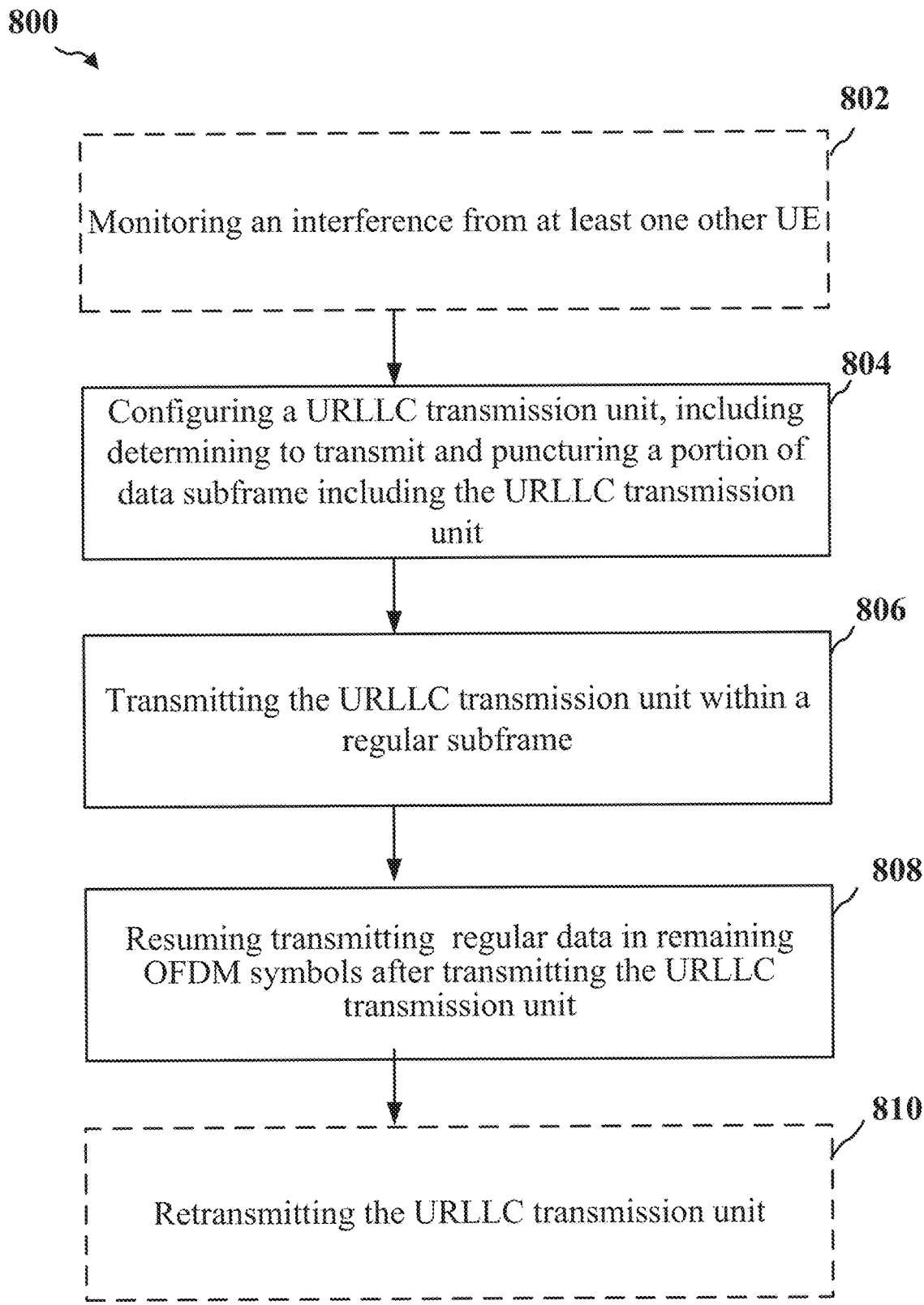
FIG. 8 is a flowchart of a method of wireless communication in accordance with one or more aspects of the present disclosure.

FIG. 8 is a flowchart of a method 800 of wireless communication. The method may be performed by one of the UEs 104 of FIG. 1, 350 of FIGS. 3, 701 and 702 of FIG. 7, or apparatus 902/902' of FIG. 9. An optional step is indicated in a dashed boarder.

At 802, the method 800 may include monitoring an interference from at least one other UE in the distributed C-V2X environment, according to aspects of the present disclosure. A URLLC-capable transmitting UE may monitor interferences from other UEs in the distributed C-V2X environment that may affect its URLLC transmission. For example, if another UE is transmitting either URLLC data or regular data, the other UE may generate interference to the transmitting UE that has URLLC data to transmit on the same RF resource. To achieve the high reliability of URLLC transmission, the transmitting UE need to monitor and account for the interference from other UEs.

At 804, the method 800 includes configuring an URLLC transmission unit, according to aspects of the present disclosure. When the transmitting UE has URLLC data to transmit to another UE in the distributed C-V2X environment, the transmitting UE first configure one or more URLLC transmission unit. In one application scenario, the transmitting UE is driving at a high speed on a high way when the transmitting UE vehicle needs to apply its brakes. For the safety reason, the transmitting UE may choose to send a URLLC message to the UE right behind to warn the other UE of an imminent braking.

Configuring the URLLC transmission unit may include configuring a URLLC transmission indicator, a URLLC control channel and a URLLC data portion. In one example aspect, the URLLC transmission indicator may be a one-bit channel at the beginning of a subframe to indicate whether there is a URLLC transmission in the subframe. Alternatively, the URLLC transmission indicator be placed right before the URLLC control channel. Accordingly, configuring URLLC transmission indicator may include setting the one-bit URLLC transmission indicator channel. The URLLC control channel may include information related to URLLC data transmission such as MIMO configuration information and demodulation information associated with the URLLC data. The URLLC control channel may also include other related information for decoding the URLLC data portion or data channel. The URLLC data portion include actual URLLC data to be sent to the receiving UE.

Configuring the URLLC transmission unit may also include determining a number of OFDM symbols within the regular subframe to puncture and a location of the punctured OFDM symbols within the regular subframe, depending on the amount of URLLC data to be transmitted. The URLLC data is carried within the regular subframe. For example, the transmitting UE may decide to puncture middle 4 OFDM symbols of an LTE downlink subframe to fit the URLLC control channel and the URLLC data portion into the punctured OFDM symbols.

Configuring the URLLC transmission unit may also include configuring a URLLC transmission time interval (TTI) within a regular TTI of the regular subframe. The URLLC TTI may be preconfigured and loaded into the transmitting UE. Alternatively, the transmitting UE may configure the URLLC TTI depending on the length of URLLC data portion and other factors. The URLLC TTI may be a small portion of the regular TTI, to limit the URLLC packet to a small size to reduce transmission latency. For example, as shown in FIG. 5, the URLLC TTT may be 0.14 ms compared to 0.5 ms of the regular TTI for an LTE downlink subframe.

In another example aspect, configuring the URLLC transmission unit may include configuring an URLLC channel indicator at end of the regular subframe or beginning of the next subframe. The URLLC channel indicator may include the information concerning the configured URLLC transmission unit, including the location of the punctured OFDM symbols, and the number of OFDM symbols punctured within the regular subframe. The URLLC channel indicator allows the receiving UE to locate and decode the URLLC transmission control channel and the URLLC data portion within a regular subframe efficiently.

At 806, the method 800 includes transmitting the URLLC transmission unit within a regular subframe, according to aspects of the present disclosure. In one example aspect, transmitting the URLLC transmission unit may include transmitting the URLLC transmission unit in the punctured OFDM symbols within the URLLC TTI.

In one example aspect, transmitting the URLLC transmission unit at 806 may include transmitting the punctured OFDM symbols containing the URLLC transmission unit with a transmission power with a power spectrum density (PSD) higher than a PSD for other parts of the regular subframe when the interference is higher than a threshold or the interference comes from one of the at least one other UE in the distributed C-V2X environment that is transmitting data in regular subframes. When the other UE is transmitting regular data, the other UE will directly interfere with the UE transmitting URLLC data, because the two UEs are transmitting on the same frequency resource.

In one example aspect, transmitting the URLLC transmission unit at 806 may include transmitting the URLLC transmission units on a randomly selected subchannel when the interference is higher than a threshold or the interference comes from one of the at least one other UE that is transmitting data in regular subframes. The randomly selected subchannel may provide a chance to avoid interference from another transmitting UE. The randomly selected channel may be preconfigured or allocated by a controlling node and may or may not overlap with normal or regular TTI channels. A regular TTI channel fits within a regular TTI or an integral number of TTIs.

In one example aspect, transmitting the URLLC transmission unit at 806 may include dividing the URLLC TTI into two virtual URLLC slots and transmitting the URLLC transmission unit over the two virtual URLLC slots over two subchannels, when the interference level is higher than a threshold or the interference comes from one of the at least one other UE that is transmitting data in regular subframes. The relationship between the two virtual URLLC slots is either predefined or indicated in the URLLC channel indicator at an end of the regular subframe.

In one example aspect, transmitting the URLLC transmission unit at 806 may also include transmitting an URLLC channel indicator at end of the regular subframe. As discussed above, The URLLC channel indicator may include the details of the transmitted URLLC transmission unit, such as the location of the punctured OFDM symbols, and the number of OFDM symbols punctured within the regular subframe. As such, the URLLC channel indicator enables the receiving UE to locate and decode the URLLC transmission unit efficiently.

At 808, the method 800 includes resuming transmitting regular data in remaining OFDM symbols after transmitting the URLLC transmission unit, according to aspects of the present disclosure. In one example, only a portion of OFDM symbols of a regular subframe is punctured for the URLLC transmission unit. Once those OFDM symbols for the URLLC transmission unit are transmitted, the transmitting UE will resume transmitting remaining OFDM symbols for regular data, such as LTE data. In one example embodiment, the transmission of the remaining OFDM symbols for regular data may be different from that of the URLLC transmission unit. For example, transmission power for the remaining OFDM symbols for regular data may be different from that for the URLLC transmission unit.

Finally, at 810, the method 800 may optionally include retransmitting the URLLC transmission unit, according to aspects of the present disclosure. The transmission of the URLLC data may fail for various reasons such as inadequate transmission power, a strong interference, etc. In order to achieve low latency for overall URLLC data transmission, the retransmission of the URLLC transmission unit may be performed in a blind HARQ retransmission. With blind HARQ retransmission, there is no feedback to indicate whether the reception of the retransmission has been successful. The transmitting UE may re-transmit the URLLC data for a pre-configured number of times, without any feedback from the receiving UE.

In another example aspect, retransmission of the URLLC transmission unit may be in a broadcast message. This may simplify the retransmission and reduce latency for the URLLC retransmission, in part because overhead signaling is less for the broadcast retransmission than for regular retransmissions.

The flowchart 800 is for illustration purpose and shows one possible process for configuring and transmitting a URLLC transmission unit. In practice, one or more steps shown in illustrative flowchart 800 may be combined with other steps, performed in any suitable order, performed in parallel (e.g., simultaneously or substantially simultaneously), or removed. For example, monitoring an interference at 802 may be performed in parallel to or after configuring a URLLC transmission unit at 804.

Figure 9:
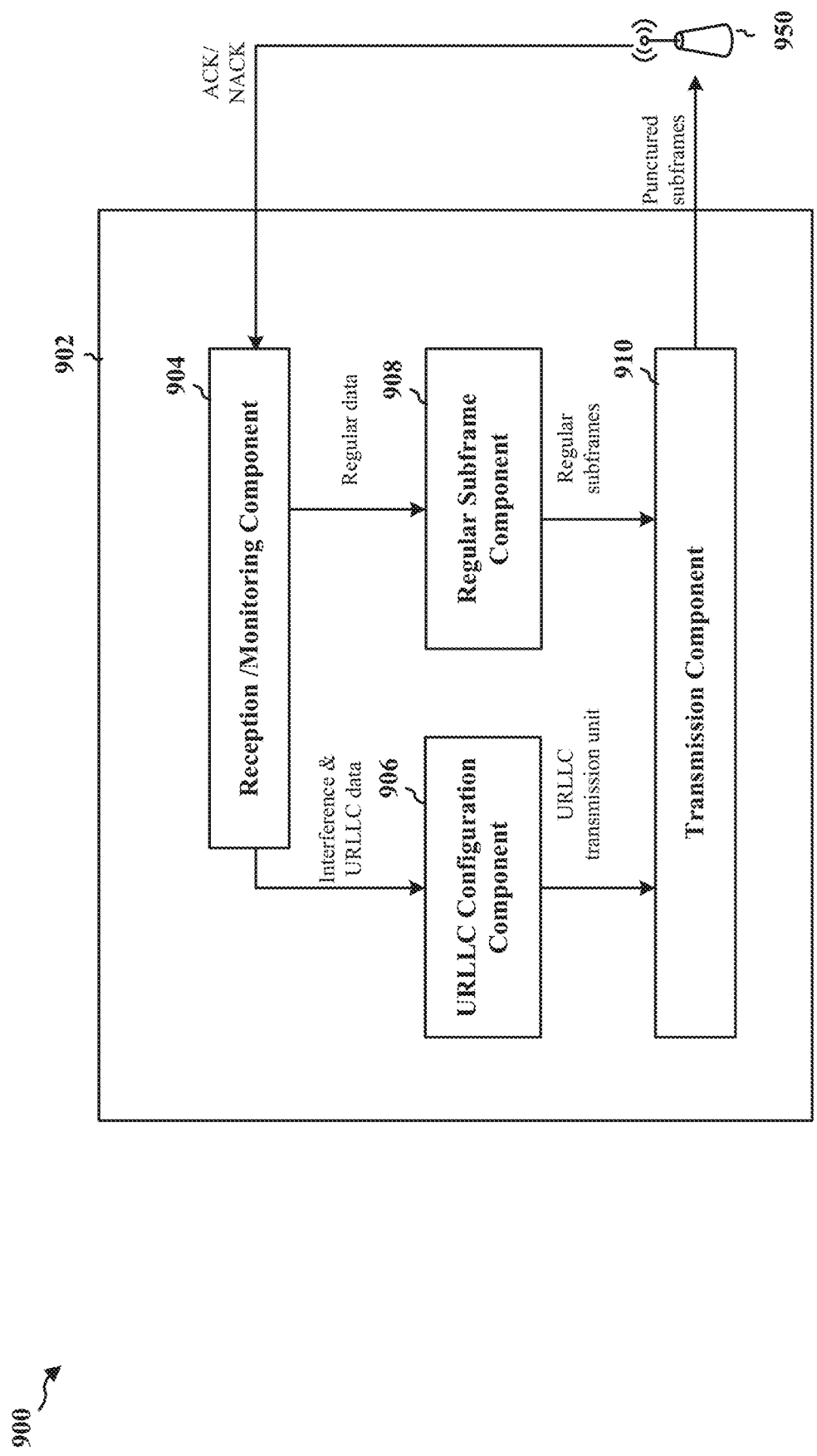
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE in a distributed C-V2X environment. The apparatus includes a reception/monitoring component 904 that is configured to receive regular data from an upper layer or another network device. For example, the application layer of the apparatus 902 may determine that a URLLC message needs to be sent to a driving UE in a next lane and thus sends the content of the message to the reception component 904 to be transmitted to the UE in the next lane. Furthermore, the reception/monitoring component may also monitor interferences from neighbor UEs and receive data from various sensors.

The apparatus 902 also includes a URLLC component 906 that receives URLLC data or interference data from the reception/monitoring component 904 and configures one or more URLLC transmission unit. The apparatus 902 also includes a regular subframe component 908 that receives regular data from the reception/monitoring component 904 and outputs the regular subframes to a transmission component 910. The apparatus 902 further includes the transmission component 910 that transmits URLLC transmission units and regular data in a punctured subframe to the receiving UE 950 in the distributed C-V2X environment.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
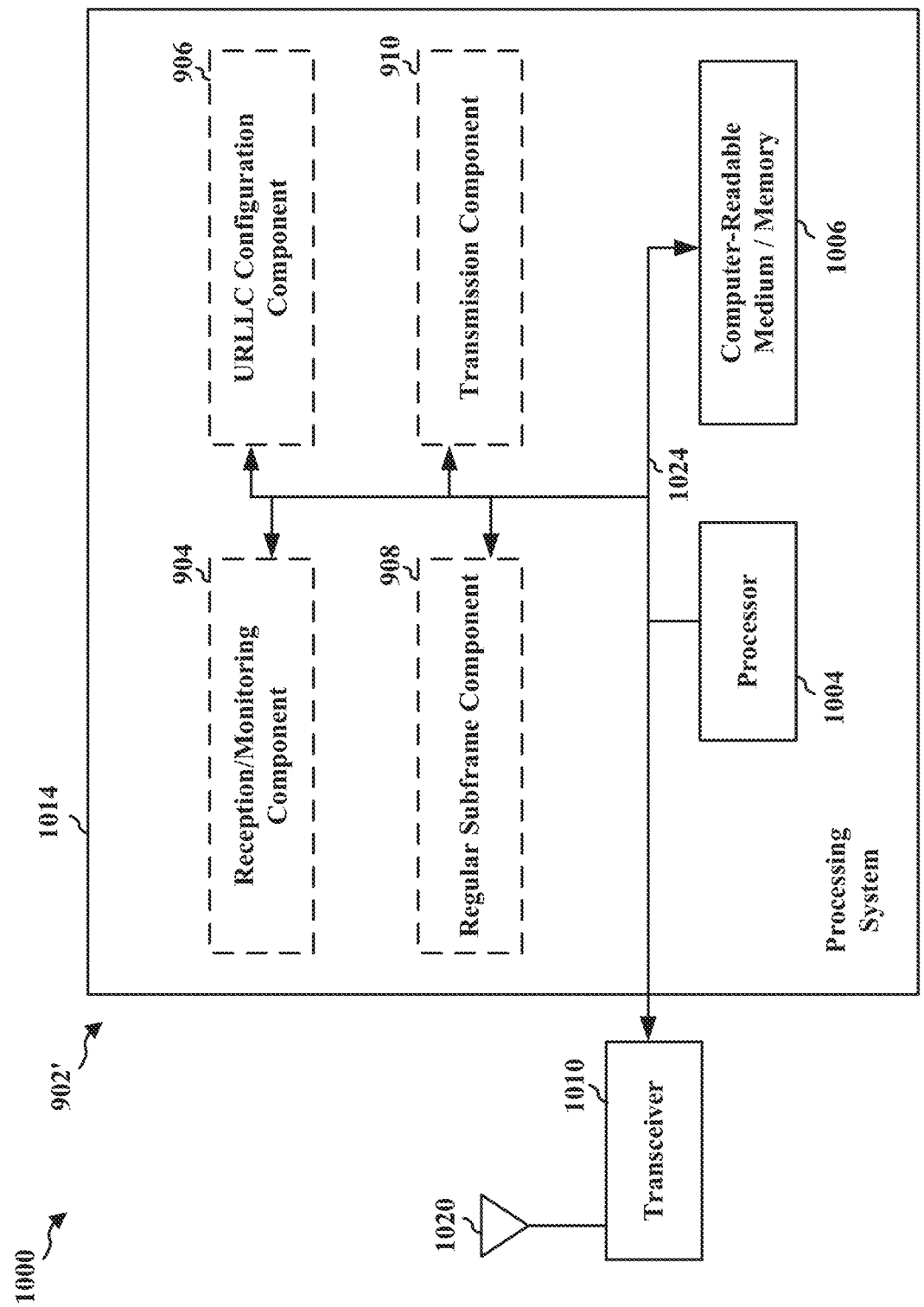
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception/monitoring component 904. In addition, the transceiver 1010 receives information from the processing system 1014, specifically the transmission component 910, and based on the received information, generates a signal to be applied to the one or more antennas 1020.

The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, and 910. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

Figure 11:
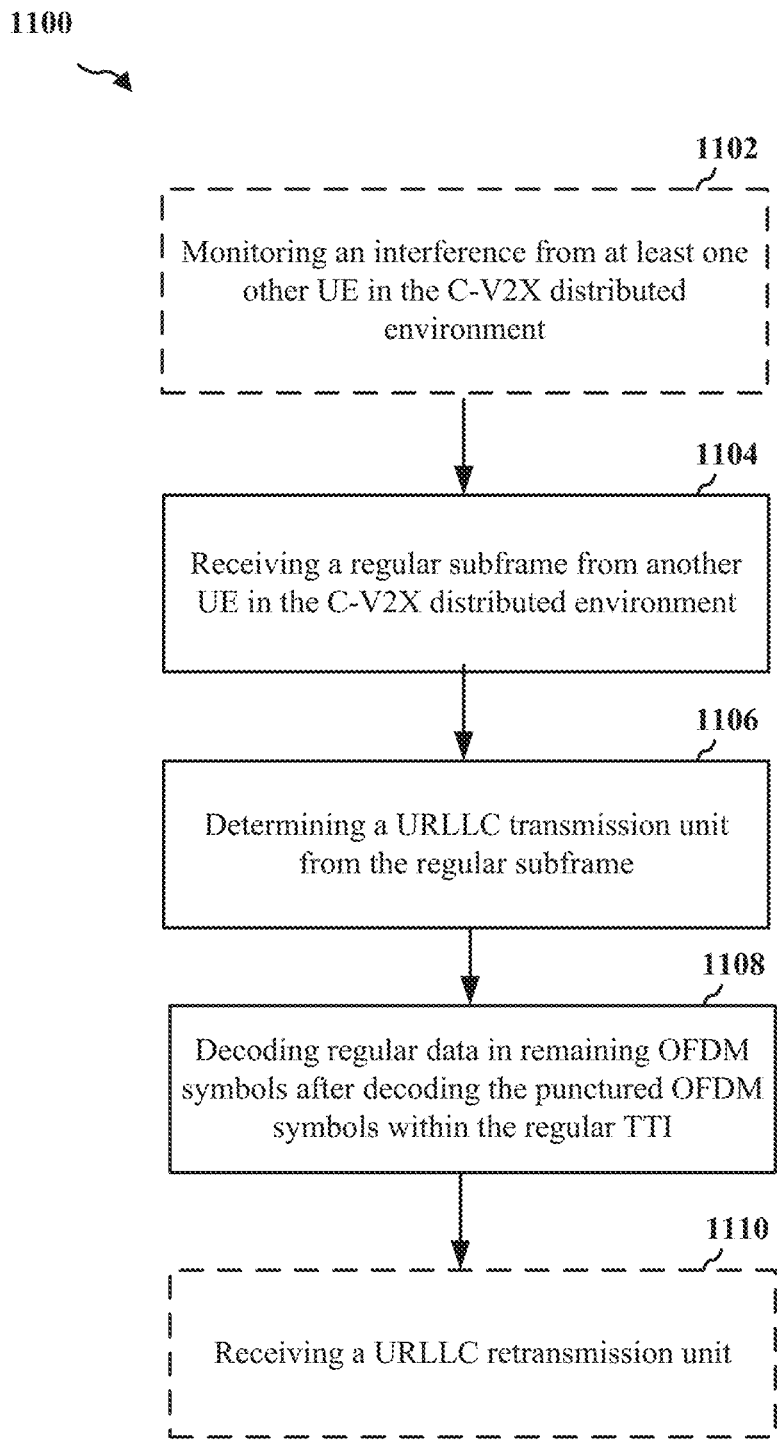
FIG. 11 is a flowchart of a method of wireless communication in accordance with one or more aspects of the present disclosure.

FIG. 11 is a flowchart of a method of wireless communication. The method may be performed by one of the UEs 104 of FIG. 1, the UE350 of FIG. 3, the UEs 701 or 702 of FIG. 7, or apparatus 1202/1202' of FIGS. 12 and 13. The UE may operate in a half-duplex mode or a full-duplex mode. An optional step is indicated in a dashed boarder. At 1102, the UE may monitor an interference from at least one other UE in the C-V2X distributed environment. For example, if another UE is transmitting either URLLC data or regular data, the other UE may generate interference to the transmitting UE that has URLLC data to transmit. To achieve the high reliability of URLLC transmission, the receiving UE may need to monitor and account for the interference from other UEs.

At 1104, the method 1100 includes receiving a regular subframe from another UE in the C-V2X distributed environment. If the received regular subframe includes URLLC data, receiving the regular subframe also includes receiving at least one URLLC transmission unit.

At 1106, according to some aspects of the present disclosure, the method 1100 includes determining a URLLC transmission unit from the regular subframe. Determining the URLLC transmission unit may include determining whether URLLC transmission unit is present in the received regular subframe. To accomplish this, the receiving UE may check and determine whether a URLLC transmission indicator is set. In one example aspect, there is a URLLC transmission indicator at the beginning of the received regular subframe that is a one-bit channel to indicate whether there is a URLLC transmission in the regular subframe.

In one example aspect, when the receiving UE determines the URLLC transmission unit is present in the received regular subframe, the receiving UE may determine the location and length of the OFDM symbols that are punctured by the transmitting UE to fit the URLLC transmission unit. To achieve this, the receiving UE proceeds to decoding a URLLC channel indicator at end of the received regular subframe. The URLLC channel indicator indicates the location and the number of the punctured OFDM symbols within the regular subframe for the URLLC transmission unit.

In one example aspect, the receiving UE may first determine and decode a URLLC control channel, based on the location and length information of the punctured OFDM symbols. In one example, the URLLC control channel precedes the URLLC data portion in the punctured OFDM symbols. The URLLC control channel comprises at least a field for MIMO information, and a field for demodulation information for the URLLC data.

With the information from the URLLC control channel, the receiving UE may then decode the URLLC data portion, which immediately follows the URLLC control channel in the punctured OFDM symbols.

Determining the URLLC transmission unit at 1106 may also include determining a URLLC transmission time interval (TTI) within a regular TTI. The URLLC TTI may help the receiving UE to correctly receive and decode the URLLC data. In one example aspect, the URLLC TTI may be included in the received subframe, for example, in the URLLC channel indicator at the end of the subframe. In another aspect, the URLLC TTI may be preconfigured. In general, the URLLC TTI is a portion of the regular TTI.

Determining the URLLC transmission unit at 1106 may also involve accounting for an interference that the transmitting UE experiences while transmitting the URLLLC data. When the receiving UE determines that the detected interference is higher than a threshold or the interference comes from one of the at least one other UE that is transmitting data in regular subframes, the receiving UE may attempt to detect a transmission power for the URLLC transmission unit with a power spectrum density (PSD) higher than that of other parts of the regular subframe.

In another example aspect, determining the URLLC transmission unit at 1106 may involve detecting the URLLC transmission unit on a randomly selected channel. When the interference is higher than a threshold or the interference comes from one of the at least one other UE that is transmitting data in regular subframes, the transmitting UE may randomly select a transmission channel to avoid interference. Accordingly, the receiving UE may need to determine the selected channel to determine the URLLC transmission unit. In one example aspect, the selected channel may be indicated in the URLLC channel indicator. In an alternative aspect, the selected channel for URLLC transmission unit may be signaled via a signaling message.

Determining the URLLC transmission unit at 1106 may also involve detecting the URLLC transmission unit over two virtual URLLC slots for the URLLC TTI. The transmitting UE may divide URLLC TTI into two virtual URLLC slots over two different subchannels and perform a frequency hopping in a deterministic way for these two virtual slots. The receiving UE may determine and detect the URLLC transmission unit over the two virtual URLLC slots through a relationship between the two virtual URLLC slots. The relationship may be predefined or indicated in the URLLC channel indicator, as discussed before.

At 1108, according to some aspects of the present disclosure, the method 1100 includes decoding regular data in remaining OFDM symbols after decoding the punctured OFDM symbols within the regular TTI. Once the URLLC data is decoded, the receiving UE will proceed to decoding regular data in the remaining, unpunctured OFDM symbols.

At 1110, according to some aspects of the present disclosure, the method 1100 may include receiving a URLLC retransmission unit in a blind HARQ retransmission. In an alternative aspect, the receiving UE may receive a URLLC retransmission unit in a broadcast message. The blind retransmission or broadcast retransmission may simplify the retransmission and reduce latency for the URLLC retransmission. Because of lack of feedback from the receiving UE to the transmitting UE, the receiving UE may receive, detect and discard a duplicate copy of the URLLC transmission unit.

The flowchart 1100 is for illustration purpose and shows one possible process for configuring and receiving a URLLC transmission unit. In practice, one or more steps shown in illustrative flowchart 1100 may be combined with other steps, performed in any suitable order, performed in parallel (e.g., simultaneously or substantially simultaneously), or removed. For example, monitoring an interference at 1102 may be performed in parallel to or after receiving a regular subframe at 1104.

Figure 12:
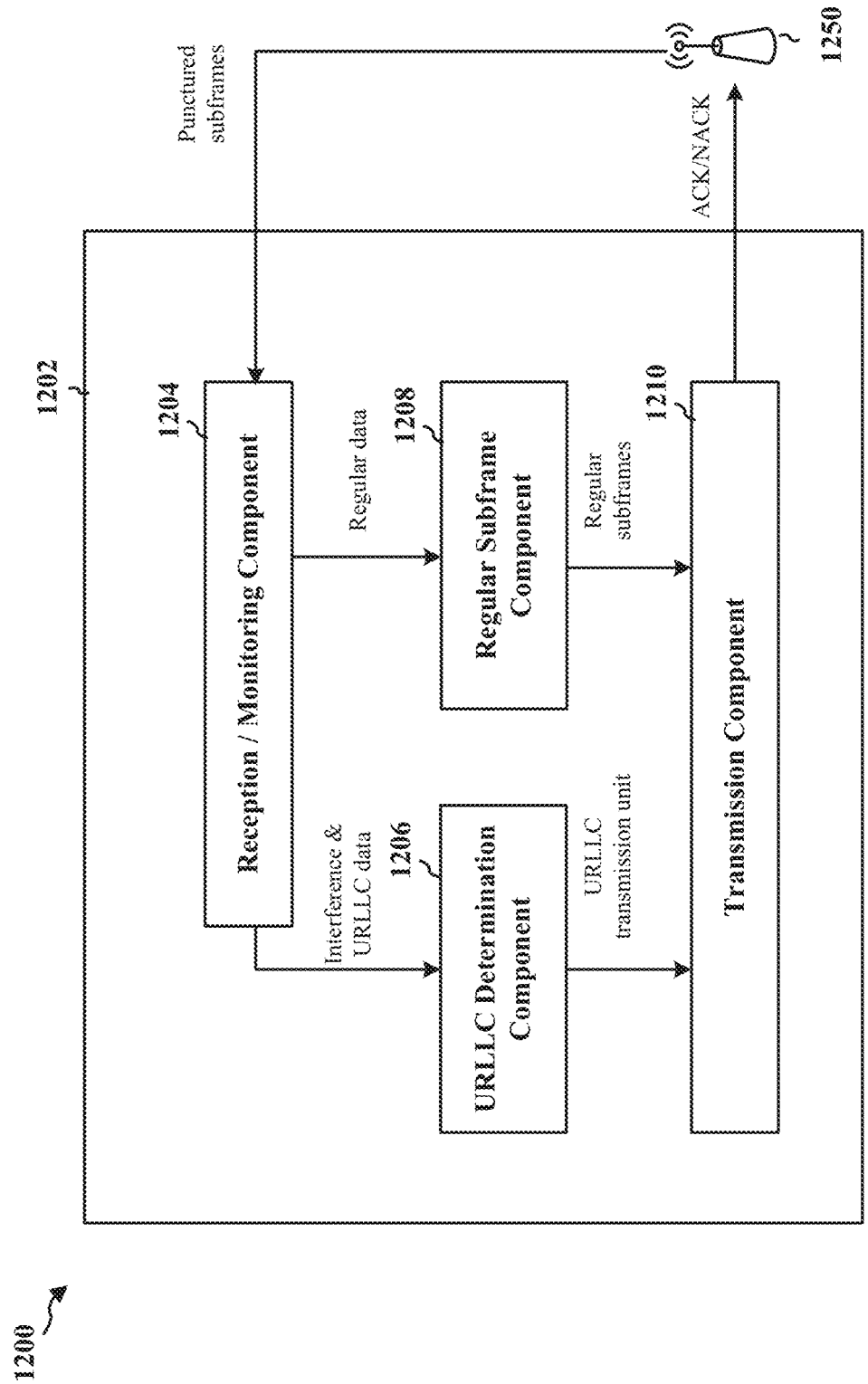
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE in a distributed C-V2X environment. The apparatus includes a reception/monitoring component 1204 that is configured to receive a punctured subframe that includes both regular data and URLLC data from a transmitting UE 1250. Additionally, the reception/monitoring component 1204 may monitor an interference from another UE in the distributed C-V2X environment. Furthermore, the reception/monitoring component is also configured to receive regular data from another network device such as another UE without any URLLC data.

The apparatus 1202 also includes a URLLC determination component 1206 that receives URLLC data from the reception/monitoring component 1204 and determines one or more URLLC transmission unit. The apparatus 1202 also includes a regular subframe component 1208 that receives regular data from the reception/monitoring component 1204 and process regular subframes. The apparatus 1202 further includes a transmission component 1210 that may send an acknowledge to the transmitting UE 1250 for the received regular data.

The apparatus 1202 may include additional components that perform each of the blocks of the algorithm in the aforementioned flowcharts of FIGS. 7 and 11. As such, each block in the aforementioned flowcharts of FIGS. 7 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
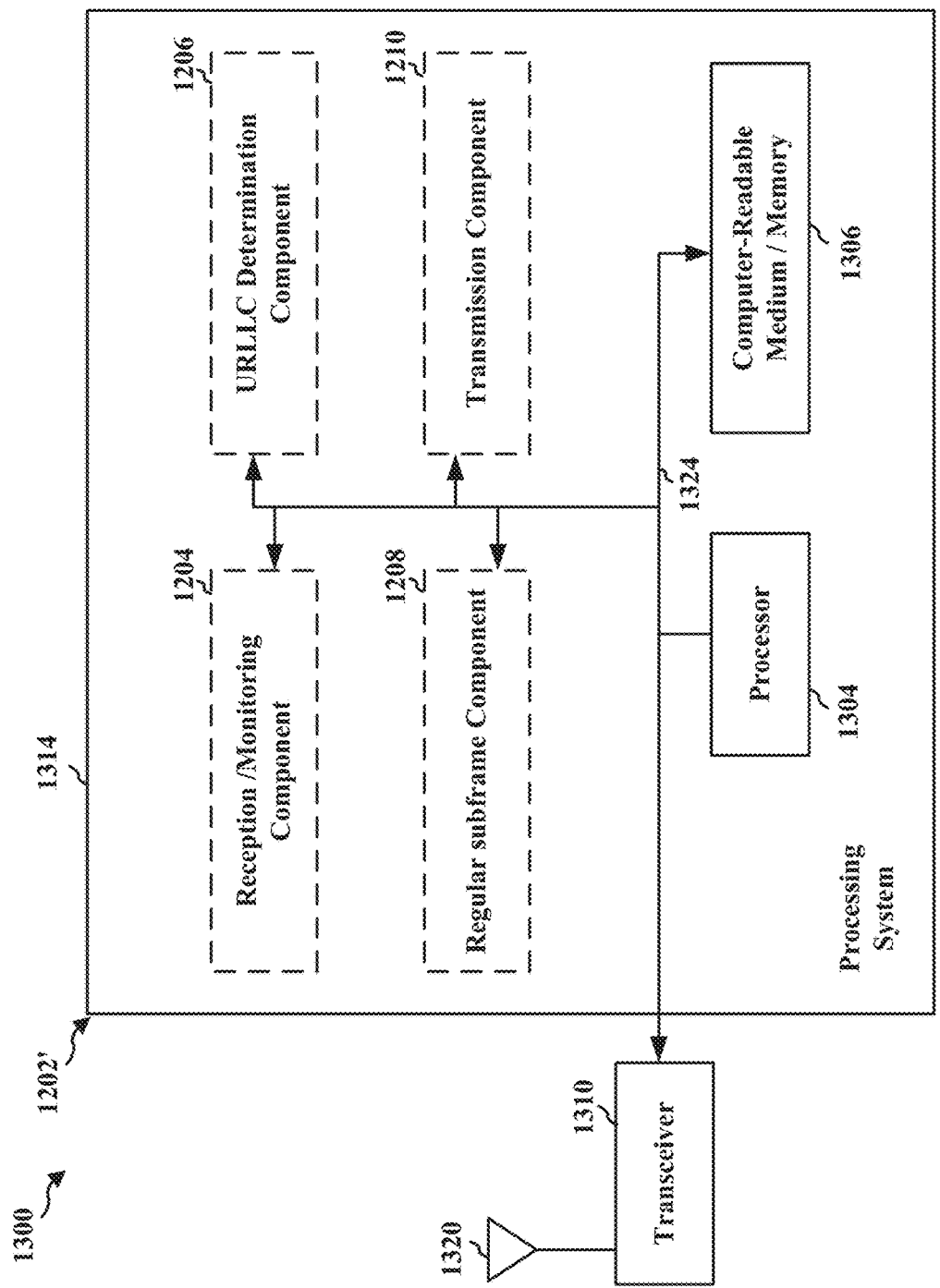
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, and 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception/monitoring component 1204. In addition, the transceiver 1310 receives information from the processing system 1314, specifically the transmission component 1210, and based on the received information, generates a signal to be applied to the one or more antennas 1320.

The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, and 1210. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

An apparatus for wireless communication at a user equipment (UE) in a distributed cellular-vehicle to everything (C-V2X) environment, comprising: means for receiving a regular subframe from another UE in the distributed C-V2X environment; and means for determining an ultra-reliable low-latency communication (URLLC) transmission unit from the regular subframe.

For the above apparatus, the means for determining the URLLC transmission unit further comprise determining a URLLC transmission indicator, a URLLC control channel and a URLLC data portion.

For the above apparatus, the URLLC transmission indicator comprises a one-bit channel to indicate whether there is a URLLC transmission in the regular subframe and is located at a beginning of the regular subframe and the URLLC control channel comprises at least fields for MIMO information, and demodulation information for the URLLC data portion.

For the above apparatus, the URLLC data portion immediately follows the URLLC control channel within the URLLC transmission unit when the URLLC transmission indicator indicates there is a URLLC transmission.

For the above apparatus, the means for determining the URLLC transmission unit further comprises detecting a URLLC channel indicator at end of a regular transmission time interval (TTI) for the regular subframe, indicating a length and a location of punctured OFDM symbols within the regular subframe for the URLLC transmission unit.

For the above apparatus the means for determining the URLLC transmission unit further comprises determining a number of punctured OFDM symbols within the regular subframe and the location of the punctured OFDM symbols within the regular subframe, based on the URLLC channel indicator.

For the above apparatus, the means for determining the URLLC transmission unit further comprises determining a URLLC TTI within the regular TTI and wherein the URLLC TTI is a portion of the regular TTI.

means for determining the URLLC transmission unit further comprises decoding the URLLC control channel and the URLLC data portion in the punctured OFDM symbols within the URLLC TTI.

The above apparatus further comprises means for monitoring an interference from at least one other UE in the distributed C-V2X environment.

For the above apparatus, the means for determining the URLLC transmission unit further comprises detecting a transmission power for the URLLC transmission unit having a power spectrum density (PSD) higher than that of other parts of the regular subframe when the interference is higher than a threshold.

For the above apparatus, the means for determining the URLLC transmission unit further comprises detecting the URLLC transmission unit on a randomly selected subchannel when the interference is higher than a threshold.

For the above apparatus, the randomly selected channel is preconfigured or allocated by a controlling node and does or does not overlap with regular TTI channels.

For the above apparatus, the means for determining the URLLC transmission unit further comprises detecting the URLLC transmission unit over two virtual URLLC slots for the URLLC TTI, when the interference is higher than a threshold.

For the above apparatus, a relationship between the two virtual URLLC slots is either predefined or indicated in a URLLC channel indicator at an end of the regular subframe.

The above apparatus further comprises means for decoding regular data in remaining OFDM symbols after decoding the punctured OFDM symbols within the regular TTI; or means for receiving a URLLC retransmission unit in a blind HARQ retransmission; or means for receiving a URLLC retransmission unit comprises in a broadcast message.

For the above apparatus, the UE is operating in a half-duplex mode or a full-duplex mode.

A method for wireless communications comprising: configuring a data subframe for carrying a first type of data; determining to transmit a second type of data; puncturing a portion of the data subframe to include the second type of data; and transmitting the punctured portion of the data subframe.

For the method, the second type of data is to be transmitted with a lower latency than the first type of data. The second type of data is ultra-reliable low-latency communication (URLLC) data.

For the method, transmitting the punctured portion of the data subframe comprises transmitting the portion of the data subframe in a URLLC Transmission Time Interval (TTI).

The method further comprises transmitting a channel indication subsequent to the transmitted punctured data subframe, where the channel indication indicates symbols of the punctured data subframe that were punctured to include the second type of data; or/and transmitting an indicator indicating that the punctured data subframe has been punctured with the second type of data. The indicator is a one-bit channel.

A method for wireless communications in a system comprising a first type of data and a second type of data, wherein the second type of data is to be transmitted with a lower latency than the first type of data, the method comprising: determining that a first type of data is being or to be transmitted during a time interval; determining to transmit a second type of data during the time interval in which the first type of data is being or to be transmitted; configuring the second type of data for transmission during the time interval; and transmitting the second type of data during the time interval in which the first type of data is being transmitted.

The method further comprises configuring a data subframe for carrying the first type of data; and wherein determining that the first type of data is being or to be transmitted during the time interval comprises: determining to transmit the data subframe; wherein configuring the second type of data for transmission during the time interval comprises: puncturing a portion of the data subframe to include the second type of data; and wherein transmitting the second type of data comprises: transmitting the punctured data subframe within the data subframe.

The method further comprises transmitting a channel indication subsequent to the transmitted punctured data frame, where the channel indication indicates symbols of the punctured data subframe that were punctured to include the second type of data.

For the method, the second type of data is ultra-reliable low-latency communication (URLLC) data. The time interval is a regular Transmission Time Interval (TTI).

The method further comprises: transmitting an indicator indicating that the data subframe has been punctured with the second type of data. The indicator is a one-bit channel.

For the method, determining that a first type of data is being or to be transmitted during a time interval comprises: determining that a different entity is transmitting the first type of data.

The method further comprises determining if interference caused by the first type of data is higher than a threshold; and wherein transmitting the second type of data during the time interval in which the first type of data is being transmitted comprises: transmitting the second type of data with a transmission power having a power spectrum density (PSD) higher than a PSD for other parts of the time interval.

For the method, the transmitting of the second type of data comprises transmitting the second type of data on a randomly selected channel when the interference is higher than a threshold.

For the method, the randomly selected channel is preconfigured or allocated by a controlling node and overlap or do not overlap with regular TTI channels. A relationship between the two virtual URLLC slots is either predefined or indicated in a regular control channel at an end of a regular subframe.

For the method, the transmitting of the URLLC transmission unit comprises dividing the URLLC TTI into two virtual URLLC slots and transmitting the URLLC transmission unit over the two virtual URLLC slots over two subchannels, when the interference is higher than a threshold.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) in a distributed cellular-vehicle to everything (C-V2X) environment, comprising:
    configuring an ultra-reliable low-latency communication (URLLC) transmission unit; and
    transmitting the URLLC transmission unit within a regular subframe to a second UE,
    wherein the configuring of the URLLC transmission unit comprises configuring a URLLC transmission indicator, a URLLC control channel, and a URLLC data portion and wherein the URLLC transmission indicator comprises a one-bit channel to indicate whether or not there is a URLLC transmission and the URLLC control channel comprises at least one or more fields for MIMO information and demodulation information for the URLLC data portion.

2. The method of claim 1, wherein the URLLC data portion immediately follows the URLLC control channel within the regular subframe and wherein the URLLC transmission indicator is located at a beginning of the regular subframe.

3. The method of claim 1, wherein the configuring of the URLLC transmission unit further comprises one or more of:
 determining a number of OFDM symbols within the regular subframe to puncture and a location of the OFDM symbols within the regular subframe;
 puncturing the number of OFDM symbols within the regular subframe and inserting the URLLC transmission unit into the punctured OFDM symbols;
 configuring an URLLC channel indicator at end of the regular subframe to indicate details of the transmitted URLLC transmission unit, including a location of the punctured OFDM symbols, and the number of OFDM symbols punctured within the regular subframe; and
 configuring a URLLC transmission time interval (TTI) within a regular TTI of the regular subframe and wherein the URLLC TTI is a portion of the regular TTI.

4. The method of claim 3, wherein the transmitting of the URLLC transmission unit comprises one or more of:
 transmitting the URLLC transmission unit in the punctured OFDM symbols within the URLLC TTI;
 transmitting the punctured OFDM symbols containing the URLLC transmission unit with a transmission power having a power spectrum density (PSD) higher than a PSD for other parts of the regular subframe when an interference is higher than a threshold;
 transmitting the URLLC transmission units on a randomly selected channel when the interference is higher than a threshold; and
 dividing the URLLC TTI into two virtual URLLC slots and transmitting the URLLC transmission unit over the two virtual URLLC slots over two subchannels, when the interference is higher than a threshold.

5. The method of claim 4, wherein a relationship between the two virtual URLLC slots is either predefined or indicated in a regular control channel at an end of the regular subframe; wherein the randomly selected channel is preconfigured or allocated by a controlling node and overlaps or do not overlap with regular TTI channels.

6. The method of claim 4, further comprising one or more of:
 resuming transmitting regular data in remaining OFDM symbols after transmitting the URLLC transmission unit in the punctured OFDM symbols;
 monitoring an interference from at least one other UE in the distributed C-V2X environment;
 retransmitting the URLLC transmission unit in a blind HARQ retransmission; and
 retransmitting the URLLC transmission unit in a broadcast message.

7. The method of claim 3, wherein the UE is operating in a half-duplex mode or a full-duplex mode.

8. An apparatus for wireless communication at a user equipment (UE) in a distributed cellular-vehicle to everything (C-V2X) environment, comprising:
 means for configuring an ultra-reliable low-latency communication (URLLC) transmission unit; and
 means for transmitting the URLLC transmission unit within a regular subframe to a second UE,
 wherein the means for configuring the URLLC transmission unit further comprises configuring a URLLC transmission indicator, a URLLC control channel, and a URLLC data portion and wherein the URLLC transmission indicator comprises a one-bit channel to indicate whether or not there is a URLLC transmission and the URLLC control channel comprises at least fields for MIMO information and demodulation information for the URLLC data portion.

9. The apparatus of claim 8, wherein the URLLC data portion immediately follows the URLLC control channel within the regular subframe and wherein the URLLC transmission indicator is located at a beginning of the regular subframe.

10. The apparatus of claim 8, wherein the means for configuring the URLLC transmission unit further comprises one or more of
 determining a number of OFDM symbols within the regular subframe to puncture and a location of the OFDM symbols within the regular subframe;
 puncturing the number of OFDM symbols within the regular subframe and inserting the URLLC transmission unit into the punctured OFDM symbols;
 configuring an URLLC channel indicator at end of the regular subframe to indicate details of the transmitted URLLC transmission unit, including a location of the punctured OFDM symbols, and the number of OFDM symbols punctured within the regular subframe; and
 configuring a URLLC transmission time interval (TTI) within a regular TTI of the regular subframe and wherein the URLLC TTI is a portion of the regular TTI.

11. The apparatus of claim 10, wherein the means for transmitting the URLLC transmission unit further comprises transmitting the URLLC transmission unit in the punctured OFDM symbols within the URLLC TTI.

12. The apparatus of claim 11, wherein the means for transmitting the URLLC transmission unit further comprises one or more of:
 transmitting the punctured OFDM symbols containing the URLLC transmission unit with a transmission power having a power spectrum density (PSD) higher than a PSD for other parts of the regular subframe when an interference is higher than a threshold;
 transmitting the URLLC transmission unit further comprises transmitting the URLLC transmission units on a randomly selected channel when the interference is higher than a threshold; and
 dividing the URLLC TTI into two virtual URLLC slots and transmitting the URLLC transmission unit over the two virtual URLLC slots over two subchannels, when the interference is higher than a threshold.

13. The apparatus of claim 12, wherein the randomly selected channel is preconfigured or allocated by a controlling node and overlap or do not overlap with regular TTI channels.

14. The apparatus of claim 12, wherein a relationship between the two virtual URLLC slots is either predefined or indicated in a regular control channel at an end of the regular subframe and wherein the UE is operating in a half-duplex mode or a full-duplex mode.

15. The apparatus of claim 11, further comprising means for one or more of
 monitoring an interference from at least one other UE in the distributed C-V2X environment;
 resuming transmitting regular data in remaining OFDM symbols after transmitting the URLLC transmission unit in the punctured OFDM symbols;
 retransmitting the URLLC transmission unit in a blind HARQ retransmission; and
 retransmitting the URLLC transmission unit in a broadcast message.

16. An apparatus for wireless communication at a user equipment (UE) in a distributed cellular-vehicle to everything (C-V2X) environment, comprising:
   a memory; and
   at least one processor coupled to the memory and configured to:
   configure an ultra-reliable low-latency communication (URLLC) transmission unit; and
   transmit the URLLC transmission unit within a regular subframe to a second UE,
   wherein to configure the URLLC transmission unit comprises configuring a URLLC transmission indicator, a URLLC control channel, and a URLLC data portion; and wherein the URLLC transmission indicator comprises a one-bit channel to indicate whether or not there is a URLLC transmission and the URLLC control channel comprises at least fields for MIMO information and demodulation information for the URLLC data portion.

17. The apparatus of claim 16, wherein the URLLC data portion immediately follows the URLLC control channel within the regular subframe and wherein the URLLC transmission indicator is located at a beginning of the regular subframe.

18. The apparatus of claim 16, wherein to configure the URLLC transmission unit further comprises one or more of:
   determining a number of OFDM symbols within the regular subframe to puncture and a location of the OFDM symbols within the regular subframe;
   puncturing the number of OFDM symbols within the regular subframe and inserting the URLLC transmission unit into the punctured OFDM symbols;
   configuring an URLLC channel indicator at end of the regular subframe to indicate details of the transmitted URLLC transmission unit, including a location of the punctured OFDM symbols, and the number of OFDM symbols punctured within the regular subframe; and
   configuring a URLLC transmission time interval (TTI) within a regular TTI of the regular subframe and wherein the URLLC TTI is a portion of the regular TTI.

19. A method of wireless communication at a user equipment (UE) in a distributed cellular-vehicle to everything (C-V2X) environment, comprising:
   receiving a regular subframe from another UE in the distributed C-V2X environment; and
   determining an ultra-reliable low-latency communication (URLLC) transmission unit from the regular subframe,
   wherein the determining of the URLLC transmission unit comprise determining a URLLC transmission indicator, a URLLC control channel and a URLLC data portion, and
   wherein the URLLC transmission indicator comprises a one-bit channel to indicate whether there is a URLLC transmission in the regular subframe, and is located at a beginning of the regular subframe and the URLLC control channel comprises at least fields for MIMO information, and demodulation information for the URLLC data portion; or wherein the URLLC data portion immediately follows the URLLC control channel within the URLLC transmission unit when the URLLC transmission indicator indicates there is a URLLC transmission.

20. The method of claim 19, wherein the determining of the URLLC transmission unit comprises one or more of:
   detecting a URLLC channel indicator at end of a regular transmission time interval (TTI) for the regular subframe, indicating a length and a location of punctured OFDM symbols within the regular subframe for the URLLC transmission unit;
   determining a number of punctured OFDM symbols within the regular subframe and the location of the punctured OFDM symbols within the regular subframe, based on the URLLC channel indicator;
   determining a URLLC TTI within the regular TTI and wherein the URLLC TTI is a portion of the regular TTI;
   decoding the URLLC control channel and the URLLC data portion in the punctured OFDM symbols within the URLLC TTI;
   detecting a transmission power for the URLLC transmission unit having a power spectrum density (PSD) higher than that of other parts of the regular subframe when an interference is higher than a threshold; and
   detecting the URLLC transmission unit on a randomly selected channel or subchannel when the interference is higher than a threshold; and
   detecting the URLLC transmission unit over two virtual URLLC slots for the URLLC TTI, when the interference is higher than a threshold.

21. The method of claim 20, wherein the randomly selected channel or subchannel is preconfigured or allocated by a controlling node and does or does not overlap with regular TTI channels; and wherein a relationship between the two virtual URLLC slots is either predefined or indicated in a URLLC channel indicator at an end of the regular subframe.

22. The method of claim 19, further comprising one or more of:
   monitoring an interference from at least one other UE in the distributed C-V2X environment;
   decoding regular data in remaining OFDM symbols after decoding the punctured OFDM symbols within the regular TTI;
   receiving a URLLC retransmission unit in a blind HARQ retransmission; and
   receiving a URLLC retransmission unit comprises in a broadcast message.

* * * * *